United States Patent
Furuta

(10) Patent No.: US 8,032,009 B2
(45) Date of Patent: Oct. 4, 2011

(54) BACKUP MANAGEMENT APPARATUS

(75) Inventor: Hideo Furuta, Hino (JP)

(73) Assignee: Seiko Epson Corporation, Tokyo (JP)

( * ) Notice: Subject to any disclaimer, the term of this patent is extended or adjusted under 35 U.S.C. 154(b) by 1225 days.

(21) Appl. No.: 11/729,031

(22) Filed: Mar. 27, 2007

(65) Prior Publication Data

US 2007/0223883 A1   Sep. 27, 2007

(30) Foreign Application Priority Data

Mar. 27, 2006 (JP) ................... 2006-085208
Dec. 6, 2006 (JP) ................... 2006-329050
Dec. 20, 2006 (JP) ................... 2006-342138

(51) Int. Cl.
*H04N 5/93* (2006.01)
*H04N 5/92* (2006.01)

(52) U.S. Cl. ................... 386/279; 386/326

(58) Field of Classification Search ............ 386/279, 386/326, 200, 235, 278, 332, 360
See application file for complete search history.

(56) References Cited

U.S. PATENT DOCUMENTS 5,541,738 A * 7/1996 Mankovitz ............... 386/245
2003/0031457 A1 2/2003 Miomo et al.

FOREIGN PATENT DOCUMENTS

| JP | 05-313973 | 11/1993 |
|---|---|---|
| JP | 11-185375 | 7/1999 |
| JP | 2003-114820 A | 4/2003 |
| JP | 2003-208344 A | 7/2003 |

* cited by examiner

*Primary Examiner* — Robert Chevalier
(74) *Attorney, Agent, or Firm* — Nutter McClennen & Fish LLP; John J. Penny, V.

(57) ABSTRACT

A backup processor for backing up data stored on a first storage medium to a second storage medium includes an obtaining unit that obtains, from the first storage medium, backup reference data for referring to directory data included in the data to be backed up; a memory that stores the backup reference data; a recording position determining unit that refers to the directory data on the first storage medium on the basis of the backup reference data stored in the memory, determines recording positions on the second storage medium for recording the directory data and a file belonging to a directory indicated by the directory data, and stores the recording positions in the memory; and a write unit that obtains the directory data from the first storage medium, refers to the memory, writes the directory data at the recording position of the directory data on the second storage medium, reads file data from the first storage medium, and writes the file data at the recording position of the file on the second recording medium.

4 Claims, 13 Drawing Sheets

FIG. 4B

| - | 12 | 13 | 14 | 15 | 16 | 17 | .... | 22 | 23 | .... | 26 | 27 | - |
|---|---|---|---|---|---|---|---|---|---|---|---|---|---|
| Lead-In | Empty | Volume Descriptor (Main) | Volume Descriptor (Terminator) | Root Directory Record | 2006 Directory Record | ABCD0010.JPG File Data | .... | ABCD0010.JPG File Data | ABCD0011.JPG File Data | .... | ABCD0011.JPG File Data | Path Table | Lead-Out |

FIG. 4A

| - | 1 | 2 | 3 | 4 | 5 | 6 | 7 | 8 | 9 | - |
|---|---|---|---|---|---|---|---|---|---|---|
| Lead-In | Empty | Volume Descriptor (Main) | Volume Descriptor (Terminator) | Root Directory Record | 2005 Directory Record | ABCD0001.JPG File Data | ABCD0002.JPG File Data | ABCD0003.JPG File Data | Path Table | Lead-Out |

FIG. 7

MEMORY CARD DIRECTORY STRUCTURE (700)

| | | |
|---|---|---|
| 701 | localParentDir | The number for the parent directory on the FAT medium. By referring to the number, reference can be made to DIRLIST_CARD structure of the parent directory. Used to build a directory structure in the FAT medium. |
| 702 | NewDirID | The number for the parent directory on the backup medium. Used to build a directory structure on the backup medium. |
| 703 | ParthLength | The length of path of a long file name to this directory. Used to check whether the Joliet standard is not violated. |
| 704 | ShortPathLength | The length of path of a short file name to this directory. Used to check whether the ISO9660 standard is not violated. |
| 705 | DirLeve | The depth of the directory hierarchy. Used to build a directory structure on the backup medium. |
| 706 | ClusterNumber | Cluster storing this directory entry on the FAT medium. Used to access the FAT medium. |
| 707 | EntryOffset | Offset storing the directory entry in the above cluster. Used to access the FAT medium. |
| 708 | StartFileLBN | The sector number on the backup medium for the first file under the directory. Used to write a file to the backup medium. |
| 709 | StartDirLBN | The sector number on the backup medium for starting writing the directory record. Used to specify the sector number for starting writing the directory record on the backup medium. The sector number is an ISO9660/Joliet value. |
| 710 | StartDirSize | Size of the directory record on the backup medium. Used as information of the directory record generated on the backup medium. The size is an ISO9660/Joliet value. |
| 711 | StartUDFDirLBN | Sector for starting writing the UDF file identifier descriptor on the backup medium. Used to write the file identifier descriptor on the backup medium. The sector number is an UDF value. |
| 712 | DirNum | The number of child directories under this directory. This is UDF data. |
| 713 | FileIdentDescSize | Size of the UDF file identifier descriptor on the backup medium. Used to write the directory record on the backup medium. The size is an ISO9660/Joliet value. |

FIG. 8

CD DIRECTORY STRUCTURE

800

| | |
|---|---|
| 801 localParent | The number for the parent directory on the CD/DVD. By referring to the number, reference can be made to DIRLIST_CDDVD structure of the parent directory. Used to build a directory structure in the FAT medium. |
| 802 NewDirID | The number for the parent directory on the backup medium. Used to build a directory structure on the backup medium. |
| 803 DirNum | The number of child directories under this directory. This is UDF data. |
| 804 DirLevel | The depth of the directory hierarchy. Used to build a directory structure on the backup medium. |
| 805 PathLength | The length of path to this directory. Used to check whether the ISO9660/Joliet standard is not violated. |
| 806 OldPathtableID | The path table ID in the previous session on the backup medium. Used to generate path table information on the backup medium. |
| 807 StartDirLBN | The sector number for the director record already written in the previous session on the backup medium. Used to generate path table information on the backup medium. |
| 808 StartUDFDirLBN | The sector number for starting writing the UDF file entry on the backup medium. Used to specify the number for the writing start sector for generating the UDF file entry. |
| 809 *pucFileInfo | Pointer to the area where file information (FILEINFO) is stored. The area also stores file information below this directory, the directory name, and date information. |

FIG. 9

CD FILE INFORMATION DIRECTORY STRUCTURE (900)

| | |
|---|---|
| NameLength (901) | Length of file / directory name |
| DataSize (902) | Data length<br>　File: File size<br>　Directory: Directory record size |
| DateTime(7) (903) | Date / time (7 bytes) data |
| FileFlag (904) | File flag (attribute) |
| FileLBA (905) | Sector number for directory / file |
| FileName (906) | Directory / file name |

FIG. 14

WRITING MAP

500

| | NUMBER OF SECTORS NECESSARY FOR DIRECTORY | NUMBER OF SECTORS NECESSARY FOR FILE(S) IMMEDIATELY BELOW DIRECTORY | WRITING START SECTOR NUMBER |
|---|---|---|---|
| ROOT | 1 | 0 | 15 |
| 2005 | – | – | 5 |
| 2006 | 1 | 10 | 16 |

⇒ PATH TABLE 350

BACKUP MANAGEMENT APPARATUS

BACKGROUND

The entire disclosure of Japanese Patent Application Nos: 2006-085208, filed Mar. 27, 2006, 2006-329050, filed Dec. 6, 2006 and 2006-342138, filed Dec. 20, 2006 are expressly incorporated by reference herein.

1. Technical Field

The present invention relates to techniques for backing up data stored on a recording medium to another recording medium, and more particularly to techniques for quickly backing up a large amount of data in a backup processor with a limited memory capacity.

2. Related Art

Image data captured with an electrophotographic still camera (so-called "digital camera") or a digital video camera is first stored in a semiconductor memory contained in the camera. A user of the camera backs up the image data stored in the semiconductor memory to another recording medium, such as a compact-disc recordable (CD-R) or a digital versatile disc (DVD), and then deletes the image data in the semiconductor memory so that the semiconductor memory can be used repeatedly.

In other words, because electrophotographic still cameras and digital video cameras have become popular and widely used, more and more general users back up a large amount of data in a rapidly increasing number of instances.

If the file system of a storage medium storing the original data to be backed up is different from the file system of a storage medium for backup, a backup processor must convert the file system. To back up data using a personal computer (PC) or the like, a data image of a storage medium for backup is generated in the PC, and then the data is collectively written to the storage medium (for example, see JP-A-11-185375).

To generate the data image in the backup processor, however, it requires a large memory capacity, which corresponds to the capacity of the storage medium for backup.

SUMMARY

An advantage of some aspects of the invention is that it provides techniques for quickly backing up a large amount of data in a backup processor with a limited memory capacity.

According to an aspect of the invention, there is provided a backup processor for backing up data stored on a first storage medium to a second storage medium, including the following elements: an obtaining unit that obtains, from the first storage medium, backup reference data for referring to directory data included in the data to be backed up; a memory that stores the backup reference data; a recording position determining unit that refers to the directory data on the first storage medium on the basis of the backup reference data stored in the memory, determines recording positions on the second storage medium for recording the directory data and a file belonging to a directory indicated by the directory data, and stores the recording positions in the memory; and a write unit that obtains the directory data from the first storage medium, refers to the memory, writes the directory data at the recording position of the directory data on the second storage medium, reads file data from the first storage medium, and writes the file data at the recording position of the file on the second recording medium.

Accordingly, a large amount of data can be quickly backed up without generating a large data image in the backup processor.

It is preferable that the first storage medium be a storage medium in a file allocation table (FAT) file system, and that the backup reference data be data for referring to a directory entry on the first storage medium.

In this case, the second storage medium is a storage medium in a compact-disc read-only memory (CD-ROM) file system and stores existing data. It is preferable that the backup processor further include the following elements: a storage unit that obtains existing directory reference data for referring to existing directory data included in the existing data and stores the existing directory reference data in the memory; and a generation unit that generates a path table after the data to be backed up has been backed up to the second storage medium by referring to the memory and obtaining the recording position on the second storage medium for recording the directory data included in the data to be backed up and the existing directory reference data.

BRIEF DESCRIPTION OF THE DRAWINGS

The invention will be described with reference to the accompanying drawings, wherein like numbers reference like elements.

FIGS. 4A and 4B show the data structure of the CD-R, which stores the existing data, after data to be backed up has been written thereto.

FIG. 7 shows the data structure of a memory card directory structure 700.

FIG. 8 shows the data structure of a CD directory structure 800.

FIG. 9 shows the data structure of a CD file information structure 900.

FIG. 14 shows an example of a writing map indicating writing sector numbers.

DESCRIPTION OF EXEMPLARY EMBODIMENTS

A backup processor according to an embodiment of the invention will be described with reference to the drawings.

Figure 1:
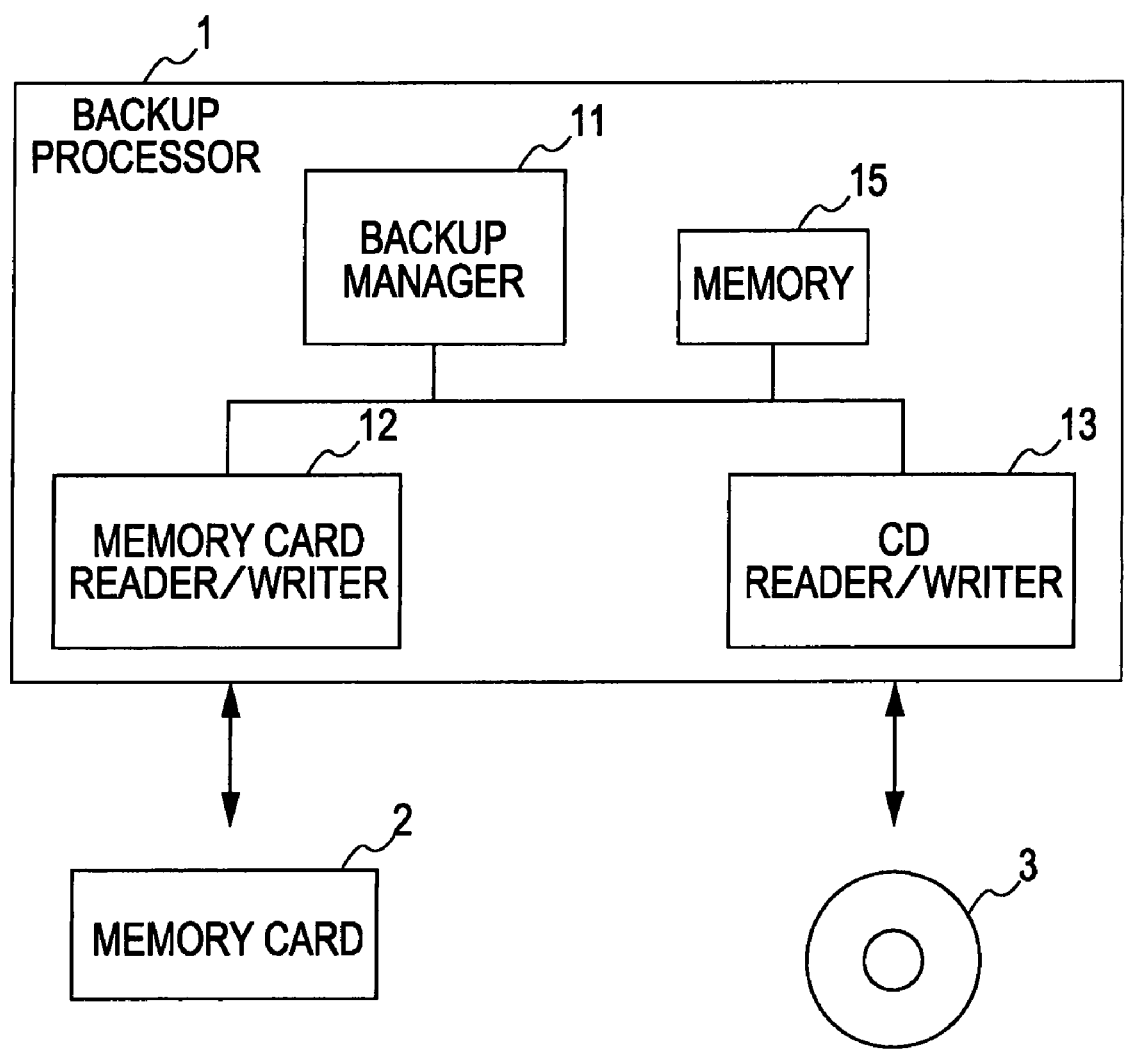
FIG. 1 is a functional diagram of a backup processor according to an embodiment of the invention.

FIG. 1 is a functional diagram of a backup processor 1 according to the embodiment.

The backup processor 1 performs a backup by copying data stored on a first storage medium to a second recording medium. According to the embodiment, the case in which data stored on a memory card 2 is backed up to a CD-R 3 will be described. However, the first and second storage media are not limited to the memory card 2 and the CD-R 3 and can be of other types.

The backup processor 1 is composed of, for example, a general computer system. The individual elements or functions of the backup processor 1 described below are realized, for example, by executing a computer program.

The backup processor 1 may be an independent processor. Alternatively, the backup processor 1 may be embedded in another apparatus, such as a printer, a digital multifunctional apparatus, or a viewer, and be realized as part of the functions of the apparatus. Alternatively, the backup processor 1 may be realized in combination with an electrophotographic still camera or a digital video camera by using some of the functions of the camera.

The backup processor 1 shown in FIG. 1 includes a backup manager 11, a memory card reader/writer 12, a CD reader/writer 13, and a memory 15.

The memory card reader/writer 12 reads data stored on the memory card 2 and writes data to the memory card 2.

The CD reader/writer 13 reads data stored on the CD-R 3 and writes data to the CD-R 3.

The backup manager 11 performs an operation to back up data stored on the memory card 2 to the CD-R 3. For example, the backup manager 11 reads the directory structure of the data to be backed up and information for managing files included in each directory from the memory card 2 and stores the read information in the memory 15. Using the information stored in the memory 15, the backup manager 11 determines the writing position for writing the data to be backed up onto the CD-R 3 and backs up the data from the memory card 2 to the CD-R 3.

According to the embodiment, even in the case that the capacity of the memory 15 is not so large, an efficient backup is performed by limiting the number of accesses to the memory card 2.

Figure 2:
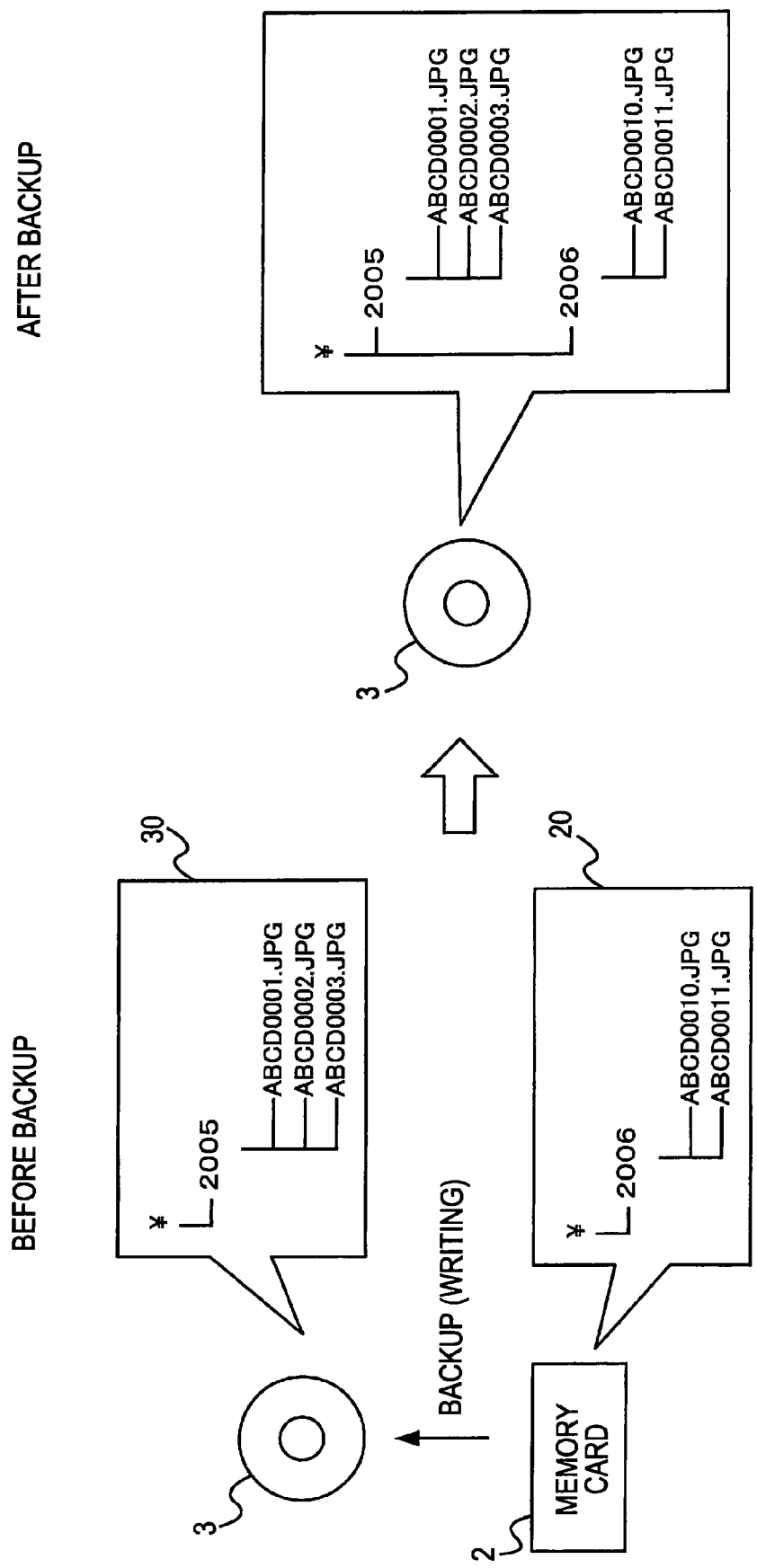
FIG. 2 illustrates an example of a backup according to the embodiment.

FIG. 2 shows an example in which data stored on the memory card 2 is backed up to the CD-R 3.

As shown in FIG. 2, the memory card 2 stores data 20 to be backed up, which will be simply referred to as "data 20". The memory card 2 is a recording medium in a FAT file system. The data 20 may be the entirety or selected segments of the data stored on the memory card 2. The data 20 may contain a music photo/video (MPV) file.

The CD-R 3 stores existing data 30 for one session. The CD-R 3 is a storage medium in a CD-ROM file system. In the embodiment described below, the case in which the data 20 is written to the CD-R 3 storing the existing data 30 will be described.

Figure 3:
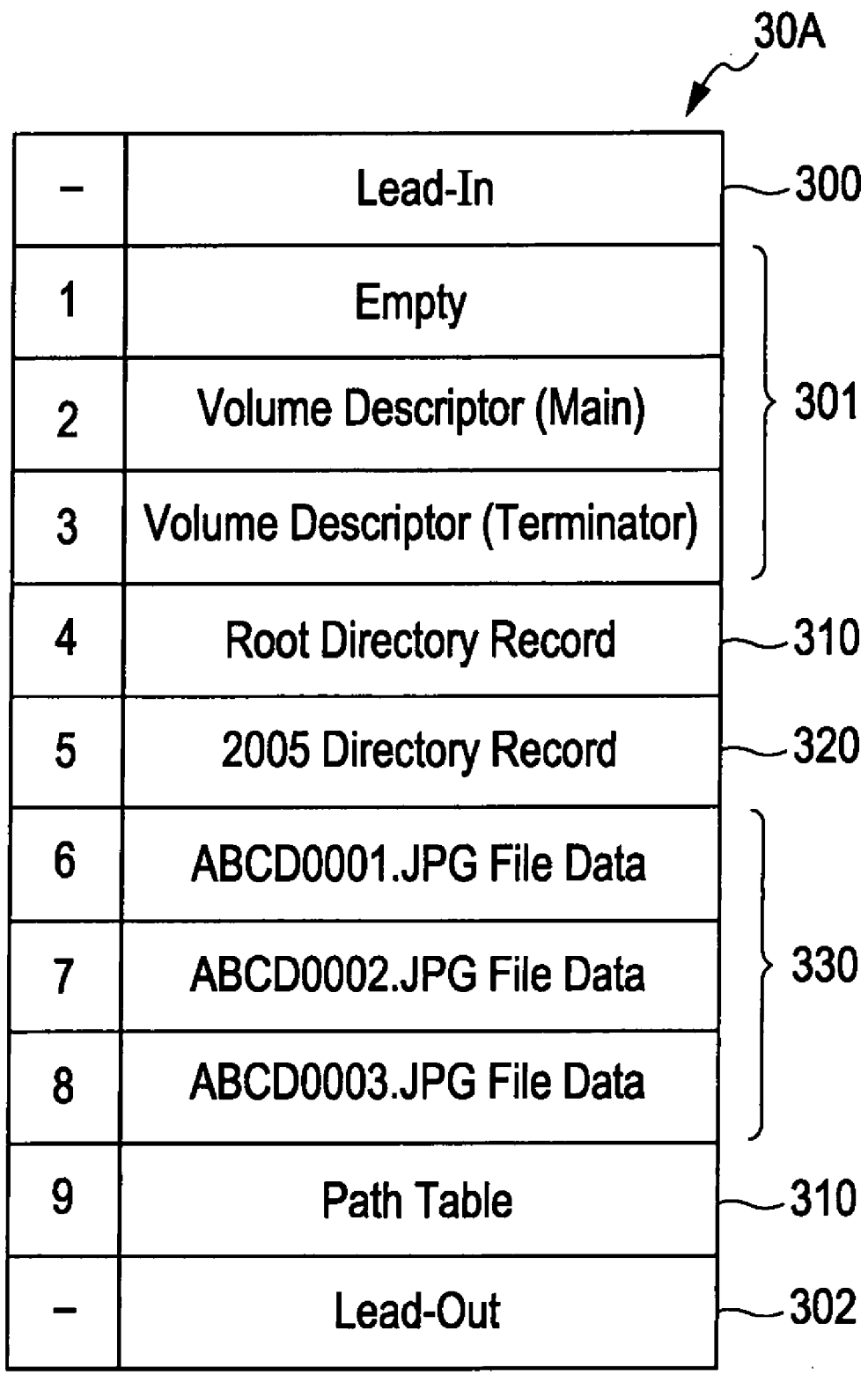
FIG. 3 shows the data structure of a CD-R storing existing data.

FIG. 3 shows the data structure of the CD-R 3 before the backup begins. That is, the data structure of the CD-R 3 storing the existing data 30 is shown in FIG. 3.

The CD-R 3 has a structure in the CD-ROM file system. The data recording position on the CD-R 3 is specified by a sector number.

A Lead-In 300 is provided in a Lead-In area at the beginning of an existing session 30A storing the existing data 30, and a Lead-Out 302 is provided in a Lead-Out area at the end of the existing session 30A. The Lead-In 300 and the Lead-Out 302 are written by the CD reader/writer 13 at the end of a session in which pieces of data 301, 310, 320, 330, and 340 are written, which will be described later.

Between the Lead-In 300 and the Lead-Out 302, a management area 301 (sectors 1 to 3) in the CD-ROM file system, a root directory record 310 (sector 4), a "2005" directory record 320 (sector 5) immediately below the root directory, data files 33Q (sectors 6 to 8) stored in a "2005", directory, and a path table 340 (sector 9) indicating the directory structure of the entire data stored on the CD-R 3 are provided.

According to the embodiment, the case of a CD-R conforming to the International Organization for Standardization (ISO) 9660 Level 1 standard will be described. However, the invention is applicable to other specifications, such as ISO 9660 Level 2, Joliet, Universal Disk Format (UDF), and the like.

FIG. 4A shows the data structure of the CD-3 before the backup, and 4B shows the data structure of the CD-R 3 after the backup, that is, the data 20 is written onto the CD-R 3 storing the existing session 30A, thereby recording an additional session 20A.

More specifically, FIG. 4A shows the data structure of the existing session 30A including sectors 0 to 10 shown in FIG. 3, and FIG. 4B shows the data structure of the additional session 20A, which is added subsequent to sector 11.

The additional session 20A includes, as shown in FIG. 4B, a management area 301 (sectors 12 to 14), a root directory record 311 (sector 15), a "2006" directory record 321 (sector 16), data files 331 (sectors 17 to 26), and a path table 350 (sector 27) between the Lead-In 300 and the Lead-Out 302.

Figure 5:
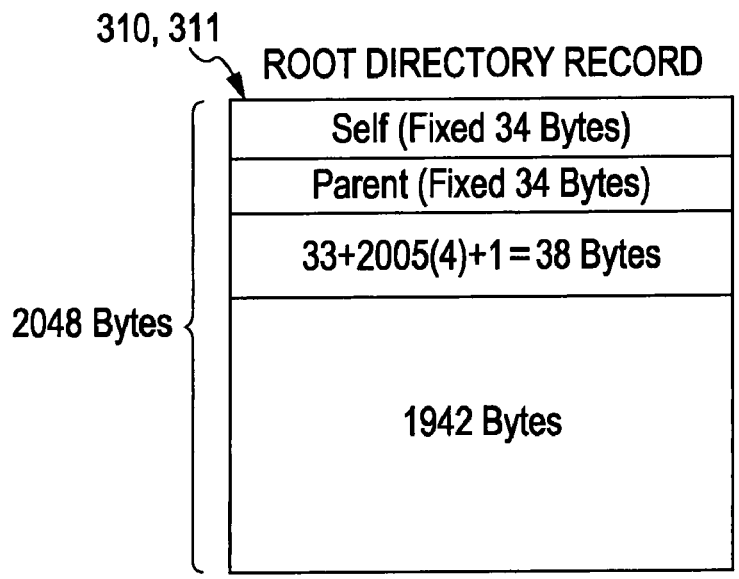
FIG. 5 shows the data structure of a root directory record.
Figure 6:
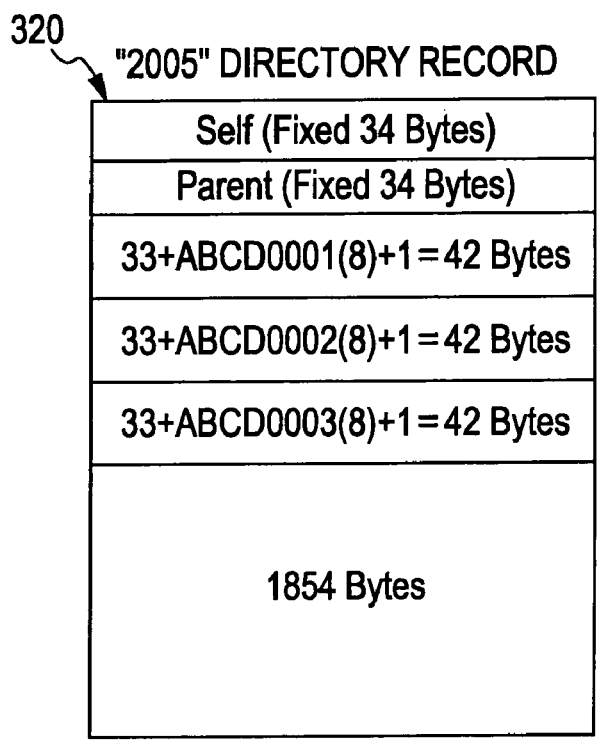
FIG. 6 shows the data structure of a "2005" directory record.

FIG. 5 shows the data structure of the root directory records 310 and 311, and FIG. 6 shows the data structure of the "2005" directory record 320 serving as a representative example of a subdirectory.

As is clear from FIGS. 5 and 6, each of the directory records 310, 311, and 320 includes the name of each directory and file immediately below itself. Thus, the size of directory records differs according to the directory structure.

A process of generating the directory records 311 and 321 and the path table 350 included in the additional session 20A will be described.

Referring back to FIG. 1, the backup manager 11 reads the cluster number and the entry offset at which each directory entry is stored from the memory card 2. The backup manager 11 generates a memory card directory structure 700, which will be described later, in the memory 15 and stores the cluster number and the entry offset.

FIG. 7 shows the data structure of the memory card directory structure (DIRLIST_CARD) 700. The memory card directory structure 700 is generated for each directory. The values read from the memory card 2 may be set only in a cluster number (ClusterNumber) 706 and an entry offset (EntryOffset) 707 of the memory card directory structure 700. In other words, at least information necessary for accessing each directory entry is read from the memory card 2.

If necessary, values computed by the backup manager 11 are stored in other items of the memory card directory structure 700. For example, a value computed by the backup manager 11 is stored in a directory record sector (StartDirLBN) 709, which will be described later.

The backup manager 11 reads the identification (ID) of the path table 340 for a currently valid session and the sector numbers of the root directory record 310 and the path table 340 from the CD-R 3. The backup manager 11 further generates a CD directory structure 800, which will be described later, in the memory 15 and stores the obtained information.

FIG. 8 shows the data structure of the CD directory structure (DIRLIST_CDDVD) 800. The CD directory structure 800 is generated for each directory. The values read from the CD-R 3 are set only in an old path table ID (OldPathTable ID) 806 and a directory record sector (StartDirLBN) 807 of the CD directory structure 800. In other words, at least information necessary for accessing the directory record of each directory is read from the CD-R 3.

If necessary, values computed by the backup manager 11 are stored in other items of the CD directory structure 800.

A directory-to-be-backed-up writing start sector (StartUDFDirLBN) 808 indicates the sector number at which the directory of data to be backed up is started to be written.

A file information pointer (*pucFileInfo) 809 of the CD directory structure 800 includes a pointer to a CD file information structure 900 storing information about files and subdirectories belonging to each directory.

FIG. 9 shows the data structure of the CD file information structure (FILE_INFO) 900. The CD file information structure 900 is generated for each directory referred to by the file information pointer 809 and for each file in the directory. The backup manager 11 obtains information for each item of the CD file information structure 900 from the CD-R 3.

To back up the contents of the memory card 2 to the CD-R 3, the backup manager 11 reads the data files from the memory card 2 to the memory 15 and then copies the data to the CD-R 3. The backup manager 11 generates the above-described structures 700, 800, and 900 in the memory 15 such that the backup manager 11 can refer to these structures 700, 800, and 900 to generate directory records and a new path table. Accordingly, the backup from the memory card 2 to the CD-R 3 can be efficiently performed.

Figure 10:
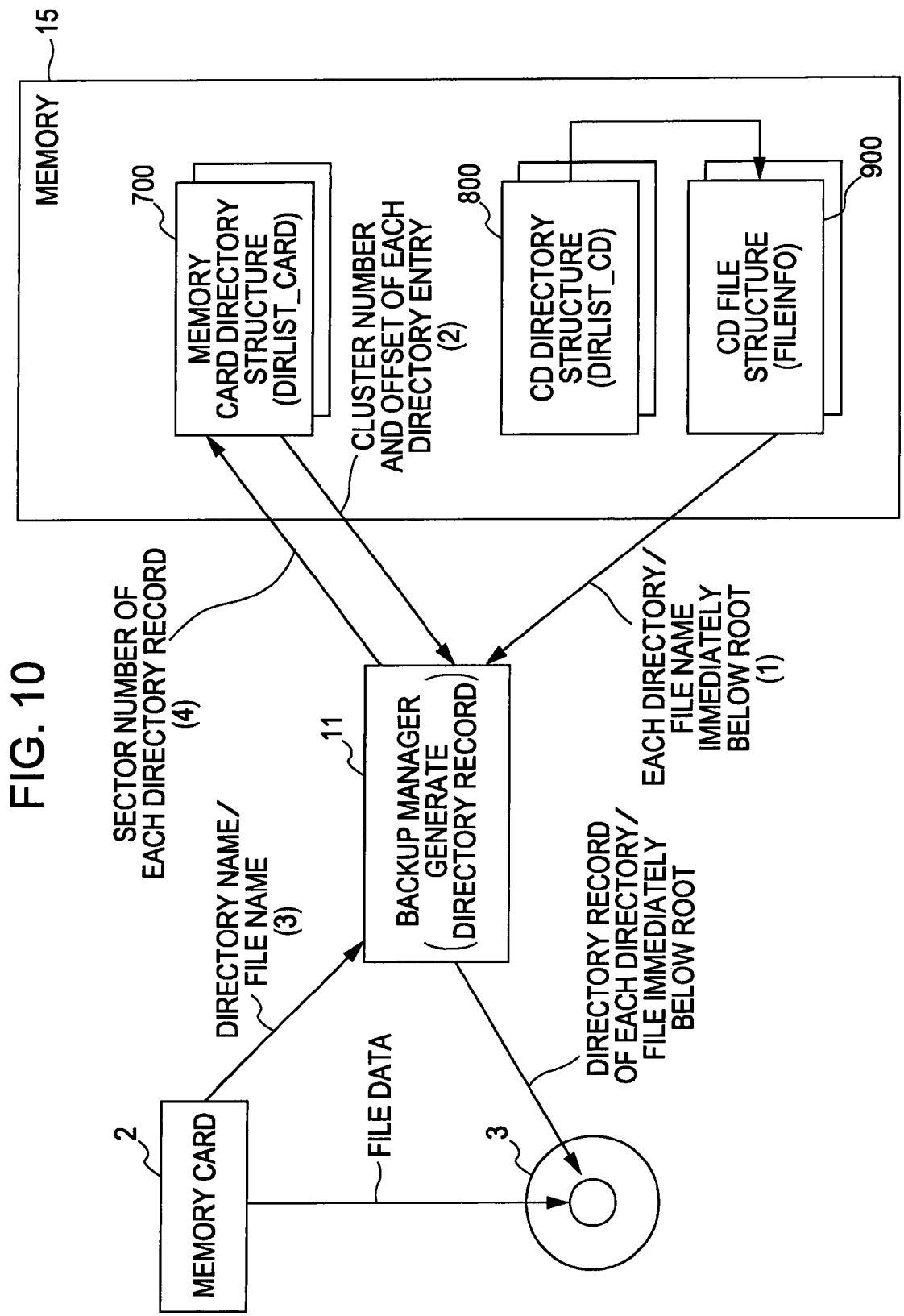
FIG. 10 illustrates the procedure of generating a directory record.

The procedure of generating each directory record will be described with reference to FIG. 10.

Firstly, the backup manager 11 generates the root directory record 311. At this point, the backup manager 11 obtains each directory/file name (FileName) 906 immediately below the root directory, which is already stored on the CD-R 3, from the CD file information structure 900 (1).

The backup manager 11 obtains, from the memory card, directory structure 700, the cluster number 706 and the entry offset 707 of the directory entry of each directory immediately below the root directory of the data stored on the memory card 2 (2). On the basis of the cluster number 706 and the entry offset 707, the backup manager 11 accesses the memory card 2 and obtains the directory name (3).

On the basis of the names of files and directories immediately below the root directory, which are obtained in the above-described manner, the backup manager 11 generates the root directory record 311 for the additional session 20A and writes the root directory record 311 to the CD-R 3.

To generate a directory record of each directory to be copied from the memory card 2 to the CD-R 3, the backup manager 11 obtains the cluster number 706 and the entry offset 707 of the directory entry of each directory on the memory card 2 from the memory card directory structure 700 (2). On the basis of the obtained cluster number 706 and the entry offset 707, the backup manager 11 accesses the memory card 2 to obtain the directory name and generates a directory record.

At this point, a new directory record of each directory included in the existing session 30A on the CD-R 3 is not generated in the additional session 20A, but that included in the existing session 30A is used.

The backup manager 11 stores, at the directory record start position 709 of the memory card directory structure 700, the sector numbers at which the root directory record 311 and the other ("2006") directory record 321 included in the additional session 20A are written (4).

Figure 11:
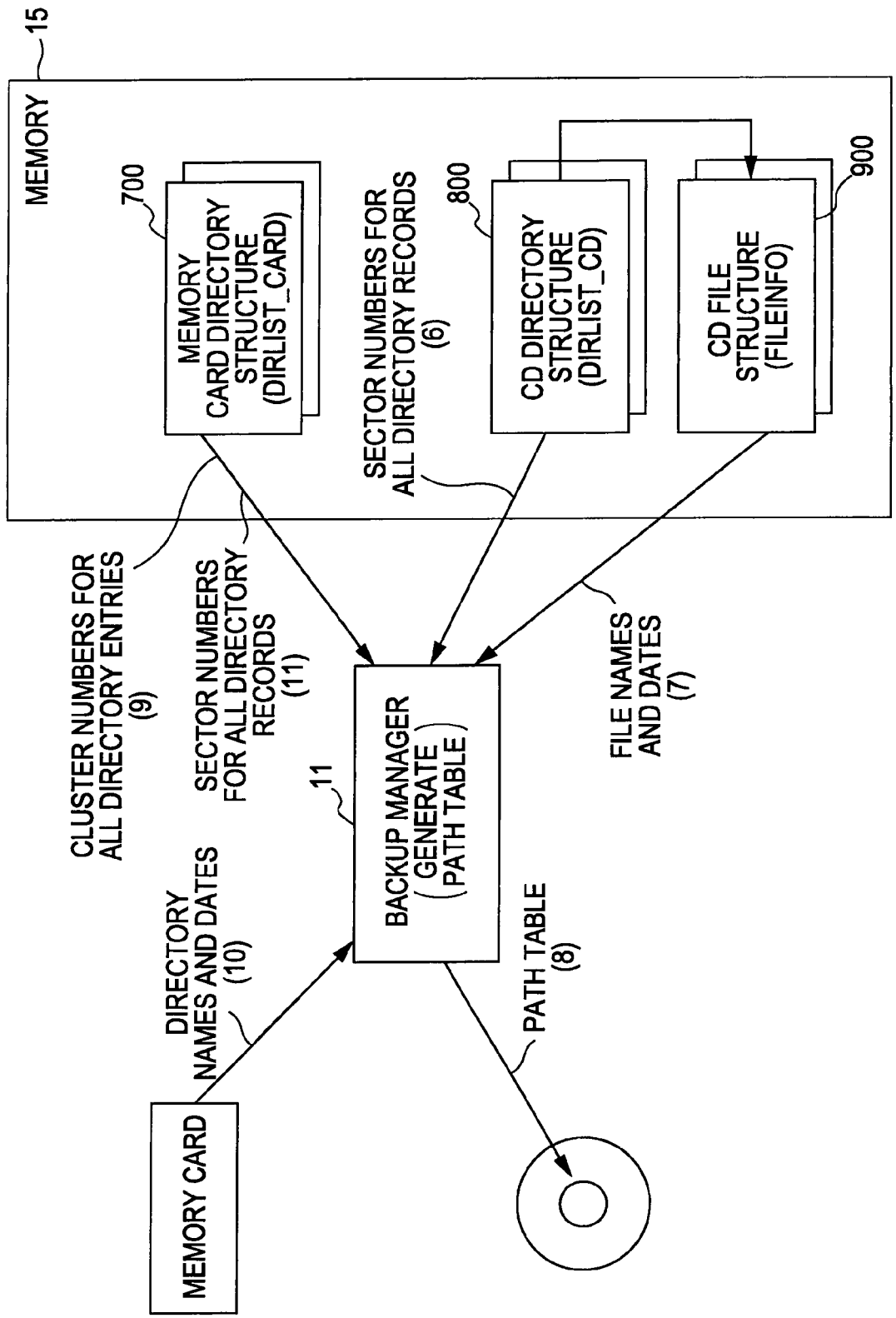
FIG. 11 illustrates the procedure of generating a path table.

The procedure of generating the path table 350 will be described with reference to FIG. 11.

Firstly, the backup manager 11 obtains the sector numbers at which all the directory records included in the existing session 30A are stored from the directory record start positions 807 and 808 (6). In addition, the backup manager 11 obtains the names and dates of all the directories included in the existing session 30A from the CD file information structure 900 (7). The backup manager 11 generates path table records of all the directories included in the existing session 30A and registers the generated path table records in the path table 350.

The backup manager 11 obtains the cluster number 706 and the entry offset 707 of each directory entry on the memory card 2 (9) and obtains the name and date of each directory from the memory card 2 (10). In addition, the backup manager 11 obtains the sector numbers at which all the directory records included in the additional session 20A are stored from the directory record start position 709 (11). On the basis of the obtained information, the backup manager 11 generates path table records of all the directories included in the additional session 20A and registers the generated path table records in the path table 350 (8).

At this point, the backup manager 11 generates the path table records in the order from the upper directory level to the lower directory level.

A process of backing up the data 20 from the memory card 2 to the CD-R 3 in the backup processor 1 with the above-described structure will be described.

Figure 12:
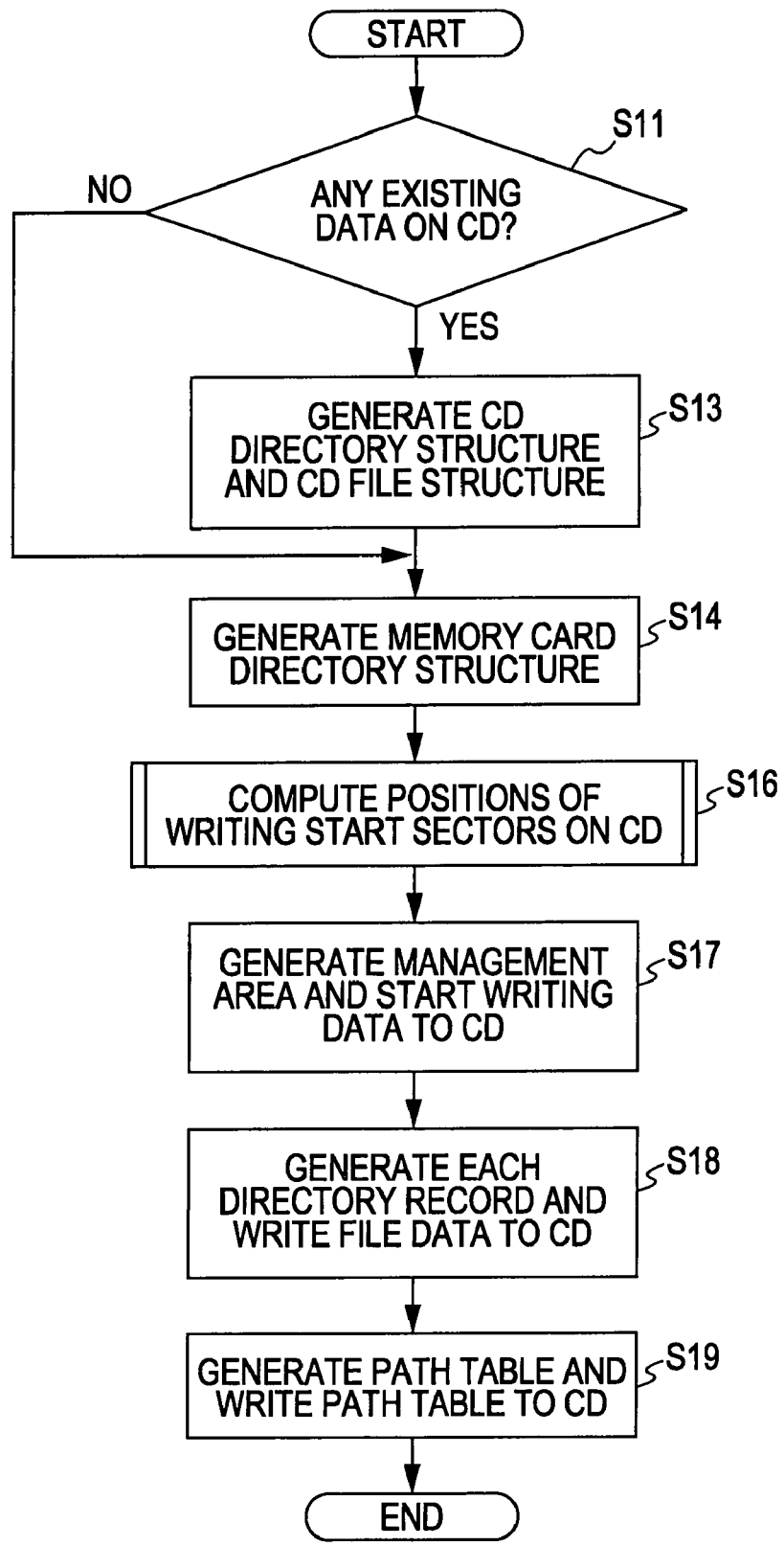
FIG. 12 is a flowchart of a process performed in one session by a backup manager.
Figure 13:
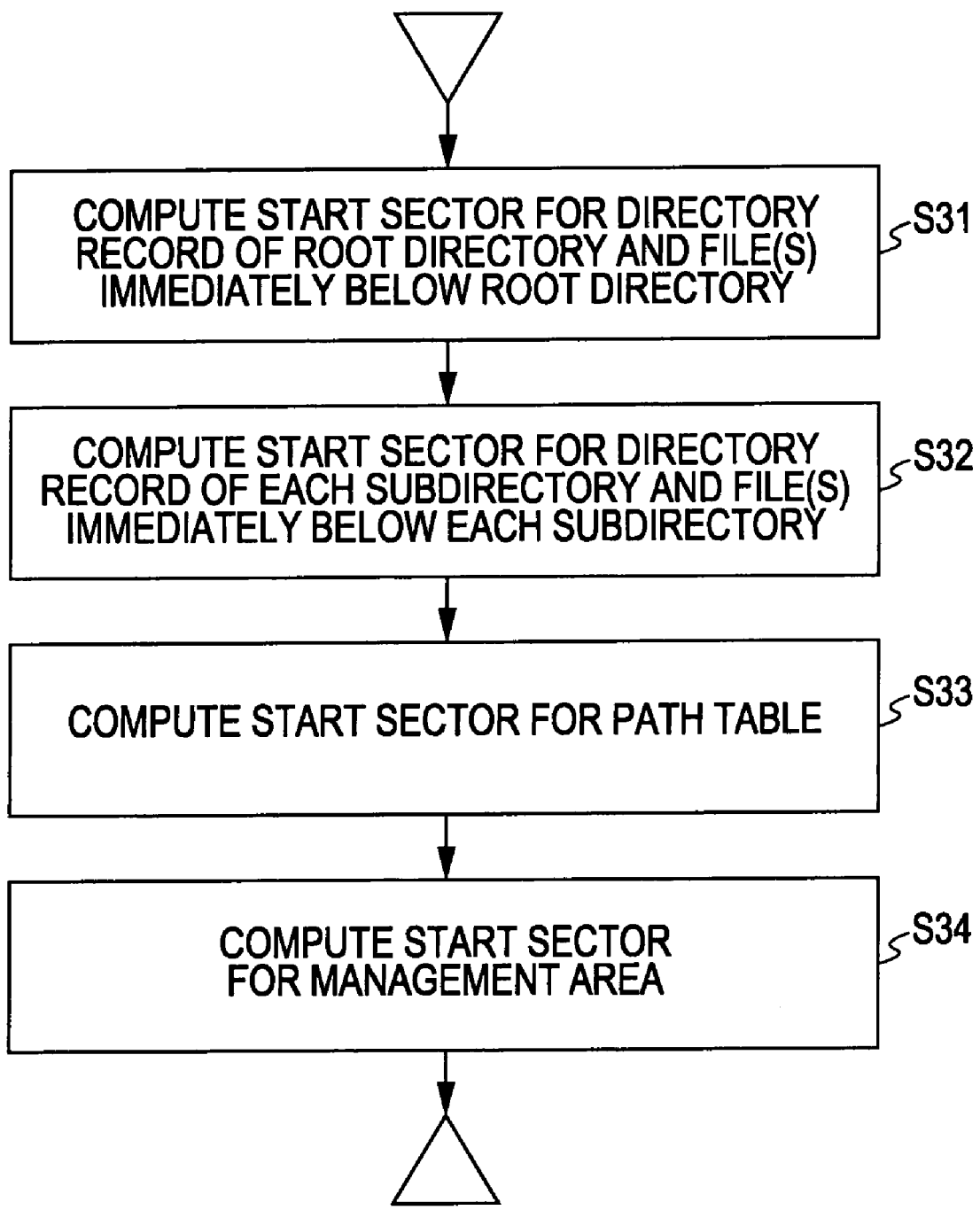
FIG. 13 is a flowchart of a detailed process of computing recording positions.

FIGS. 12 and 13 are flowcharts of a process performed in one session by the backup manager 11 to back up the data 20 to the CD-R 3.

With reference to FIG. 12, the backup manager 11 determines whether the CD-R 3 includes the existing data 30 (S11). If the CD-R 3 includes no existing data 30 ("NO" in S11), step S13 is skipped.

If the CD-R 3 includes the existing data 30 ("YES" in S11), the backup manager 11 generates the CD directory structure 800 and the CD file information structure 900 in the memory 15 (S13).

Next, the backup manager 11 generates the memory card directory structure 700 in the memory 15 (S14).

The backup manager 11 refers to the structures 700, 800, and 900 stored in the memory 15 and computes the recording positions for recording the directories and files included in the data 20 to the CD-R 3 (S16). The computation performed here will be described in detail later.

When the recording position of each directory and file is computed, the backup manager 11 generates the management area 301 necessary for this session and writes the management area 301 to the CD-R 3 (S17).

Furthermore, the backup manager 11 generates the directory records 311 and 321 of the directories included in the data 20 in the above described manner and writes the directory records 311 and 321 at the corresponding recording positions computed in step S16. The backup manager 11 reads the files from the memory card 2 and writes the files at the corresponding recording positions computed in step S16 (S18).

Finally, the backup manager 11 generates the path table 350 of the additional session 20A in the above described manner, writes the path table 350 at the corresponding recording position computed in step S16, and ends the backup session (S19).

The computation of the recording positions performed in step S16 will be described with reference to FIG. 13.

The backup manager 11 specifies the sector number to start writing data, which serves as the data recording position. According to the embodiment, the writing start sector of this session is session 11 (see FIG. 4). On the basis of this writing start sector, the subsequent sector numbers are determined.

The backup manager 11 computes the number of sectors necessary for the root directory record 311 for this session and the number of sectors necessary for the files immediately below the root on the basis of the directory structure, file names, and file sizes. Then, the backup manager 11 computes the writing start sector of the root directory record 311 and the files immediately below the root directory (S31). The computed information is stored in the memory 15.

FIG. 14 shows an example of a writing map 500.

As shown in FIG. 14, the number of sectors necessary for the root directory record 311 is one, and the number of sectors necessary for the files immediately below the root is zero (since there are no files immediately below the root). Accordingly, the writing start sector is determined as sector 15.

Next, the backup manager 11 computes the number of sectors necessary for the directory record of each subdirectory included in the data 20 and the number of sectors necessary for files immediately below each subdirectory. Then, the backup manager 11 computes the writing start sector of each subdirectory record and the files immediately below each subdirectory (S32). When there are multiple subdirectories, the writing start sector is computed for each of the subdirectories in accordance with the hierarchical directory structure.

As shown in FIG. 14, the number of sectors necessary for the "2006" directory record 321 is one, and the number of sectors necessary for the files immediately therebelow is 10. Accordingly, the writing start sector is determined as sector 16. The position of each of the computed writing start sectors is stored in the directory record sector 709 of the memory card directory structure 700.

Next, the backup manager 11 generates the path table 350 on the basis of the above-computed writing start sector of each directory record and the writing start sector of each directory record of the existing session 30A. Then, the backup manager 11 computes the writing start sector of the path table 350 (S33).

Thereafter, the backup manager 11 determines the contents of the management area 301 including a main volume descriptor and the like and computes the writing start sector of the management area 301 (S34).

Accordingly, the writing sectors of all the pieces of information to be written to the CD-R 3 in this backup session are determined.

Since the information, necessary for performing steps S31 to S34 is already stored in the memory 15, the backup manager 11 need not access the memory card 2 or the CD-R 3. As a result, processing in steps S31 to S34 can be quickly performed.

Since the writing map 500 generated in steps S31 to S34 is stored in the memory 15, the backup manager 11 need not obtain any information other than the files from the memory card 2 when writing to the CD-R 3 in processing from step S17 onward. This further contributes to an increase in the processing speed.

While the invention has been described with reference to the exemplary embodiment, it is to be understood that the invention is not limited to the disclosed embodiment. That is, those skilled in the art can make various modifications without departing from the spirit of the invention.

What is claimed is:

1. A backup processor for backing up data stored on a first storage medium to a second storage medium, comprising:
    an obtaining unit that obtains, from the first storage medium, backup reference data for referring to directory data included in the data to be backed up;
    a memory that stores the backup reference data;
    a recording position determining unit that refers to the directory data on the first storage medium on the basis of the backup reference data stored in the memory, determines recording positions on the second storage medium for recording the directory data and a file belonging to a directory indicated by the directory data, and stores the recording positions in the memory; and
    a write unit that obtains the directory data from the first storage medium, refers to the memory, writes the directory data at the recording position of the directory data on the second storage medium, reads file data from the first storage medium, and writes the file data at the recording position of the file on the second recording medium.

2. The backup processor according to claim 1, wherein the first storage medium is a storage medium in a file allocation table file system, and
    wherein the backup reference data is data for referring to a directory entry on the first storage medium.

3. The backup processor according to claim 2, wherein the second storage medium is a storage medium in a compact-disc read-only memory file system and stores existing data,
    wherein the backup processor further includes
        a storage unit that obtains existing directory reference data for referring to existing directory data included in the existing data and stores the existing directory reference data in the memory, and
        a generation unit that generates a path table after the data to be backed up has been backed up to the second storage medium by referring to the memory and obtaining the recording position on the second storage medium for recording the directory data included in the data to be backed up and the existing directory reference data.

4. A backup method comprising:
    obtaining backup reference data for referring to directory data included in data to be backed up from a first storage medium;
    storing the backup reference data in a memory;
    referring to the directory data on the first storage medium on the basis of the backup reference data stored in the memory, determining recording positions on the second storage medium for recording the directory data and a file belonging to a directory indicated by the directory data, and storing the recording positions in the memory;
    obtaining the directory data from the first storage medium, referring to the memory, and writing the directory data at the recording position of the directory data on the second storage medium; and
    reading file data from the first storage medium and writing the file data at the recording position of the file on the second recording medium.

* * * * *